2,979,383
PREPARATION OF INORGANIC SULFUR BROMIDES

Joseph Nils Ospenson, Concord, Calif., assignor to California Research Corporation, San Francisco, Calif., a corporation of Delaware No Drawing. Filed Oct. 4, 1956, Ser. No. 613,821

4 Claims. (Cl. 23—203)

This invention relates to a new and improved method of preparing inorganic sulfur bromides.

Heretofore, the use and application of sulfur bromides have been restricted by reason of the difficulties in their preparation in contrast to the comparative ease of preparation of the corresponding chlorides. The classical reaction methods involved in the preparation of sulfur bromides are not adaptable to large-scale commercial preparation and, as a consequence, the field of application of the bromides has been unduly limited.

In accordance with the present invention, a generalized method of preparing inorganic sulfur bromides has been developed which permits the direct preparation of the sulfur bromides from the corresponding or appropriate sulfur chlorides. This process involves the reaction of an inorganic sulfur chloride with hydrobromic acid in an aqueous medium to obtain direct substitution of the chlorine atom or atoms with bromine.

In referring to the class of inorganic sulfur chlorides and bromides throughout the specification and claims, it is to be understood that reference is made to such inorganic compounds of sulfur wherein sulfur has a positive valence of from 2 to 6 and contains at least one chlorine or bromine atom, as the case may be, directly bonded to the sulfur, representative of which are sulfur monochloride, sulfur dichloride, thionyl chloride, sulfuryl chloride, sulfur monobromide, thionyl bromide, thionyl chlorobromide, sulfuryl bromide, etc.

Whereas, previously, various inorganic sulfur bromides have been attained by individual reactions employing various reagent starting materials, no method of preparation has been described or proposed which was universally applicable to the preparation of all of the known sulfur bromides. However, it has been discovered that, by the use of an aqueous solution of hydrobromic acid as the brominating reactant, substantially quantitave preparation of the desired sulfur bromide may be attained.

Process variables and conditions of reaction may be varied over a considerable range with optimum conditions for rate and yield dependent upon the particular sulfur chloride charged. For optimum conversion, in all cases an excess of the stoichiometric quantities of hydrobromic acid has been employed, and the amount of excess hydrobromic acid varies for different sulfur chlorides charged. The reaction is preferably conducted at temperatures below about 10° C., again with optimum reaction temperatures dependent upon the charged sulfur chloride. In the case of sulfur monobromide, satisfactory yields are obtained at reaction temperatures in the range of —10° to +5° C. However, in the case of thionyl bromide, which is more labile to aqueous decomposition, it is desired to conduct the reaction at temperatures below —20° C.

The hydrobromic acid reactant may be charged to the reaction either through introduction of anhydrous HBr into an aqueous solution or dispersion of the inorganic sulfur chloride, or as an aqeous solution of hydrobromic acid. The rate of reaction has been found to be directly proportional to the concentration of HBr. It has been found preferable to conduct the reaction with a concentrated solution of hydrobromic acid, and particularly the concentrated hydrobromic acid of commerce which is a constant-boiling solution containing 48% HBr. Although lower HBr concentrations may be employed, the longer residence time required with the more dilute HBr would decrease the yield of the desired product by reason of the competing hydrolysis reaction in the case of the sulfur bromides which are sensitive to hydrolysis. This is particularly noted in the preparation of thionyl bromide which is highly unstable and susceptible to hydrolysis. As a further precaution in minimizing a competing hydrolysis reaction, it has been found desirable to employ a water-immiscible diluent, such as petroleum ether, in the reaction.

The inorganic sulfur bromides obtained by the subject reaction process are adapted to various applications. Aside from their use as reagents in organic synthesis, such as a specialty brominating agent in the case of thionyl bromide, the inorganic sulfur bromides may be employed in such fields as rubber vulcanization, preparation of improving agents for lubricating oils, as well as specialty application in the field of agricultural chemicals such as in the treatment of soils and fungicidal applications.

In order to illustrate the facility of the reaction process of the invention as it applies to the production of representative inorganic sulfur bromides, the following examples are presented. It is to be understood that these examples are merely illustrative of the basic reaction process and may be modified for application to other charge compounds in accordance with the above disclosure.

Example 1

200 grams of 48% aqueous hydrobromic acid were cooled by an external ice bath to 0° C., and 40.5 grams of sulfur monochloride were added during 2 minutes with agitation. The temperature was not allowed to exceed 5° C. The deep red oil which was formed was immediately phase separated. The crude yield of sulfur monobromide was 66.0 grams (98.5% of theory). The oil was dried over anhydrous sodium sulfate, and the following characteristics determined:

|  | Found | Theory |
|---|---|---|
| Density | 2.6 | 2.63 |
| $n_D$ | [1] 1.7+ | 1.736 |
| Percent Bromine | 69.7 | 71.5 |

[1] Upper limit on refractometer.

Example 2

200 grams of 48% aqueous hydrobromic acid were cooled to 0° C. and 40 grams of sulfur dichloride were added with agitation during 30 minutes. The temperature was maintained at 0° to 5° C. Two phases resulted—the bottom one a dark red color and the upper aqueous phase a bright red. The crude bottom phase was separated and weighed 45.2 grams (104% of theory for $S_2Br_2$). This oil was dried over anhydrous sodium sulfate and the crude dry product analyzed as follows:

|  | Found | Theory ($S_2Br_2$) | Theory ($SBr_2$)[1] |
|---|---|---|---|
| Density | 2.6 | 2.6 |  |
| Percent Bromine | 72.2 | 71.5 | 83.5 |

[1] Compound not reported in literature.

Thus, it appears that the product of the reaction between sulfur dichloride and aqueous HBr is sulfur monobromide. It is possible that the unstable sulfur dibromide may be initially formed but reacts to form bromine and sulfur monobromide.

Example 3

30 grams of thionyl chloride were added to 50 milliliters of petroleum ether (boiling point, 30° to 60° C.) and cooled to −30° C. 122 grams of 48% aqueous hydrobromic acid were also cooled to −20° C. and then added to the thionyl chloride solution with agitation. The temperature was maintained at −25° C. The resulting two-phase system was immediately separated and the orange-colored top phase dried over anyhdrous sodium sulfate. This dried solution was then stripped to a pot temperature of 50° to 55° C. at 35 millimeters mercury to remove the petroleum ether solvent. A 58% yield (30.4 grams) of oil was obtained with a density of 2.7. Distillation of this oil gave 26.8 grams (distilled yield of 51.5%) of thionyl bromide with the following properties:

|  | Found | Theory ($SOBr_2$) | Theory ($SOCl_2$) |
| --- | --- | --- | --- |
| Density | 2.72 | 2.70 | 1.66. |
| Boiling pt | 60° C. at 35 mm. | 68° C. at 40 mm. | 78.8° C. at 746 mm. |

Example 4

122 grams of 48% aqueous hydrobromic acid were cooled to −30° C. and a solution of 33.8 grams of sulfuryl chloride in 50 milliliters of petroleum ether (previously cooled to −30° C.) was added rapidly with agitation. Two phases separated and the bright red top phase was recovered and dried over anhydrous sodium sulfate at −20° to −25° C. When the temperature of the resultant solution was allowed to rise to ambient temperatures, a reaction occurred which liberated gases and the solution become colorless.

It is postulated that the heretofore unknown sulfuryl bromide was formed under the conditions of the reaction but that it decomposed when the temperature was allowed to approach ambient temperature. However, it is suggested that the reaction product or the postulated sulfuryl bromide may be prepared and reacted in situ as a synthesis reactant at temperatures below 0° C.

Obviously, many modifications and variations of the invention, as hereinbefore set forth, may be made without departing from the spirit and scope thereof, and therefore only such limitations should be imposed as are indicated in the appended claims.

I claim:

1. A process for the production of inorganic sulfur bromides which comprises reacting an inorganic sulfur chloride selected from the class consisting of sulfur monochloride, sulfur dichloride, and thionyl chloride with an excess of the stoichiometric quantities of hydrobromic acid in a liquid aqueous medium at temperatures below about 10° C.

2. A process for the production of sulfur monobromide which comprises reacting sulfur monochloride with an excess of the stoichiometric quantity of hydrobromic acid in a liquid aqueous medium at temperatures below about 10° C.

3. A process for the production of inorganic sulfur bromides which comprises reacting sulfur dichloride with an excess of the stoichiometric quantity of hydrobromic acid in a liquid aqueous medium at temperatures below about 10° C.

4. A process for the production of thionyl bromide which comprises reacting thionyl chloride with an excess of the stoichiometric quantity of hydrobromic acid in a liquid aqueous medium at temperatures below about 10° C.

References Cited in the file of this patent

UNITED STATES PATENTS 2,772,144     Belf     Nov. 27, 1956

OTHER REFERENCES

Feher: Angewandte Chemie, July 1955, Jahre 67, 341–2.

Booth: Inorganic Synthesis, vol. 1, McGraw-Hill Book Co. Inc., 1939, pages 113–114.

Chem. Abs. 35, 2807 (1941); 47, 12084 (1953).

Mellor: "Treatise on Inorganic and Theoretical Chemistry" (1930), vol. 10, page 676.